(12) United States Patent
Naruse

(10) Patent No.: US 8,797,626 B2
(45) Date of Patent: Aug. 5, 2014

(54) LIGHT QUANTITY ADJUSTMENT APPARATUS, LENS UNIT AND OPTICAL APPARATUS PROVIDED WITH THE SAME

(75) Inventor: Kazuhiro Naruse, Yamanashi-ken (JP)

(73) Assignee: Nisca Corporation, Minamikoma-gun, Yamanashi (JP)

( * ) Notice: Subject to any disclaimer, the term of this patent is extended or adjusted under 35 U.S.C. 154(b) by 60 days.

(21) Appl. No.: 13/404,743

(22) Filed: Feb. 24, 2012

(65) Prior Publication Data

US 2012/0218616 A1 Aug. 30, 2012

(30) Foreign Application Priority Data

Feb. 28, 2011 (JP) ................................ 2011-041830

(51) Int. Cl.
- *G02B 26/02* (2006.01)
- *G03B 9/08* (2006.01)
- *G03B 9/02* (2006.01)

(52) U.S. Cl.
CPC . *G02B 26/02* (2013.01); *G03B 9/02* (2013.01)
USPC ............ 359/234; 359/230; 396/463; 396/510

(58) Field of Classification Search
USPC .......... 359/230, 234, 233; 396/220, 458–462, 396/483–490, 493–496, 501, 510, 463; 310/36–37, 46
See application file for complete search history.

(56) References Cited

U.S. PATENT DOCUMENTS

2007/0297791 A1 * 12/2007 Fukasawa ..................... 396/506
2007/0297792 A1 * 12/2007 Hayakawa et al. ........... 396/508

FOREIGN PATENT DOCUMENTS

JP    U-H06-087941    12/1994

* cited by examiner

*Primary Examiner* — James Phan
(74) *Attorney, Agent, or Firm* — Manabu Kanesaka

(57) ABSTRACT

A light quantity adjustment apparatus has a board including an exposure aperture, blade members adjusting a quantity of light passing through the exposure aperture, and a driving device for driving the blade members. The driving device is provided with an electromagnetic coil, a magnet rotor rotating by applying a current to the electromagnetic coil, a rotating shaft, a coil frame having bearings, a reference surface for positioning formed in the coil frame, and a shield yoke supported relative to the reference surface and magnetically shielding the magnet rotor. The board includes a support plane supporting the blade members, a concave portion in the support plane to store the driving member, a support portion in the concave portion to support one end of the shield yoke, and a holding device for storing and supporting the driving member in the concave portion.

4 Claims, 14 Drawing Sheets

LIGHT QUANTITY ADJUSTMENT APPARATUS, LENS UNIT AND OPTICAL APPARATUS PROVIDED WITH THE SAME

TECHNICAL FIELD

The present invention relates to a light quantity adjustment apparatus that is incorporated into an optical apparatus including image pickup apparatuses such as a video camera and still camera, projection apparatuses such as a projector, etc. and that adjusts a quantity of light such as a shooting light quantity and projection light quantity.

BACKGROUND ART

Generally, this type of light quantity adjustment apparatus is known as a diaphragm apparatus and shutter apparatus in which a board having an exposure aperture is disposed in a shooting light path or projection light path, and a quantity of light passing through the exposure aperture of the board is adjusted with light quantity adjustment blades.

For example, Patent Document 1 (Japanese Utility Model Application Publication No. H06-87941) discloses a diaphragm apparatus in which two blade members that slide and travel in mutually opposite directions are disposed around an exposure aperture formed in a board and open and close the light path aperture from an open state to a close state.

This Patent Document 1 discloses the diaphragm apparatus in which a driving motor is installed on one side of the board having the exposure aperture in the center and operates the diaphragm blades that correspond to the blade members to adjust the light quantity.

To explain the light quantity adjustment apparatus of the invention, using the diaphragm apparatus disclosed in this Patent Document 1 as an example, described below are an installation structure of the driving motor on the board and technical issues that are the issue of the invention.

[General Driving Motor Installation State Diagram]

First, FIGS. 11 and 12 show a perspective view and principal-part exploded perspective view showing a support state of a driving motor on a base board in a conventional general diaphragm apparatus, and described is the general driving motor installation structure in the diaphragm apparatus disclosed in Patent Document 1.

As specifically shown in FIG. 13 (that corresponds to FIG. 2 in Patent Document 1), locking hooks 110 (that correspond to hooks 100a to 100d) are formed in a board 100 with an exposure aperture formed, catch portions 220 (that correspond to concave portions 3c) to catch the locking hooks 110 are formed in a coil frame 210 (that corresponds to the driving coil frame 3) constituting a driving motor 200 (that corresponds to the motor portion) installed on the board 100, and the locking hooks 110 and catch portions 220 constitute a hook locking mechanism for installing the driving motor 200 on the board 100. Then, by pressing the catch portions 220 of the driving motor 200 in the locking hooks 110 of the board 100, the catch portions 220 are locked in the locking hooks 110, and the driving motor 200 is installed on the board 100.

In addition, in the general hook locking mechanism like the driving motor installation structure as disclosed in above-mentioned Patent Document 1, in order for either one of the locking hook and the catch portion constituting the hook locking mechanism to cause elastic deformation by pressing the other one, at least the member causing elastic deformation is formed of a resin.

SUMMARY OF INVENTION

Problems to be Solved by the Invention

However, in forcibly pressing the other member (catch portion 220) in one member (locking hook 110) formed based on the premise that the member causes elastic deformation, an excessive load is sometimes imposed on one member due to variations in component accuracy of each component, the member receives the effect of the excessive load and causes not only elastic deformation but also plastic deformation, and clearance arises in the locking portion of the hook locking mechanism and causes the driving motor to rattle with respect to the base board.

Then, by receiving the effect of rattle, the installation position of the above-mentioned coil frame constituting the hook locking mechanism is displaced due to the rattle, as a result the position relationship deteriorates between a magnet rotor supported rotatably in the coil frame and a shield yoke forming a magnetic circuit together with the magnet rotor, and the following problem occurs due to the change in the state by the installation position of the shied yoke relative to the magnet rotor.

In regard to the problem, as shown in FIG. 14A, with a shield yoke 100 pressed at its one end face against a support portion 67 forming a positioning reference surface Q of a lower coil frame 60, it is beforehand set that the center position Y-Y in the width direction of the shield yoke 100 is closer to the driving arm 90 side than the center position M-M in the width direction (longitudinal direction) of a magnet rotor 70. By the position relationship between the magnet rotor 70 and the shield yoke 100, the center position M-M of the magnet rotor 70 is always magnetically biased in the S1 direction coincident with the center position Y-Y of the shield yoke 100, as a result a shaft end portion 92a on one end side of the driving arm 90 is magnetically biased in the S2 direction for coming into contact with a bowl-shaped shaft surface of a bearing portion 51a formed in an upper coil frame 50, the state is thereby maintained in which the shaft end portion 92a on one end side of the driving arm 90 is brought into contact with the bearing portion 51a of the upper coil frame 50, and smooth operation of the driving arm 90 is obtained. In contrast thereto, as shown in FIG. 14B, in the case that the shied yoke 100 is displaced in the S3 direction in which one end face of the shield yoke 100 is not pressed against the support portion 67 forming the positioning reference surface Q of the lower coil frame 60, and that the magnet rotor 70 and the shield yoke 100 are set for the position relationship in which the center position Y-Y in the width direction of the shield yoke 100 is coincident with the center position M-M in the width direction (longitudinal direction) of the magnet rotor 70, the magnet rotor 70 and the shield yoke 100 are mutually balanced magnetically, as a result the shaft end portion 92a on one end side of the driving arm 90 is always biased magnetically in the S4 direction for separating from the bowl-shaped shaft surface of the bearing portion 51a formed in the upper coil frame 50, the shaft end portion 92a on one end side of the driving arm 90 separates and floats from the bearing portion 51a of the upper coil frame 50, the bearing of the shaft end portion 92a on one end side of the driving arm 90 by the bearing portion 51a of the upper coil frame 50 becomes imperfect, and smooth operation of the driving arm 90 becomes hard to obtain.

The invention was made in view of the aforementioned problem, and it is an object of the invention to provide a light quantity adjustment apparatus capable of performing correct exposure control by smooth operation of blade members without causing the problem of faulty operation as described above.

Means for Solving the Problem

To attain the aforementioned object, a light quantity adjustment apparatus of the first aspect of the invention is provided with a board having an exposure aperture, blade members that adjust a quantity of light passing through the exposure aperture, and driving means for driving the blade members, the driving means is provided with an electromagnetic coil, a magnet rotor that rotates by applying a current to the electromagnetic coil, a rotating shaft that is the center of rotation of the magnet rotor, a coil frame which has bearings for supporting opposite ends of the rotating shaft rotatably and around which the electromagnetic coil is wound, a reference surface for positioning formed in the coil frame, and a shield yoke that is supported with respect to the reference surface and that magnetically shields the magnet rotor, and the board is comprised of a support plane that supports the blade members to enable the members to travel, a concave portion in the support plane to store the driving member from the plane side for supporting the blade members, a support portion in the concave portion to support one end of the shield yoke, and holding means for storing and supporting the driving member in the concave portion so that one end of the shield yoke is supported in the support portion and that the other end of the shield yoke can be positioned in the reference surface of the coil frame.

Further, in a light quantity adjustment apparatus of the second aspect of the invention, the above-mentioned driving means as described in the first aspect is provided with an electromagnetic coil, a cylindrical magnet rotor that rotates by applying a current to the electromagnetic coil, a rotating shaft that is the center of rotation of the magnet rotor, a first coil frame forming a bearing portion that supports one shaft end portion of the rotating shaft and a winding groove in which the electromagnetic coil is wound around an outer circumference of the bearing portion, a second coil frame forming a bearing portion that supports the other shaft end portion of the rotating shaft and a winding groove in which the electromagnetic coil is wound around an outer circumference of the bearing portion, a driving arm that rotates together with the rotating shaft and that drives the blade members, and an annular shield yoke forming an inner circumferential surface opposed to an outer circumferential surface of the magnet rotor, in the first coil frame are formed the reference surface to position the other end of the shield yoke and a support portion supported on the board by the holding means of the board, and in the second coil frame is formed a side surface into which the inner circumferential surface of the shield yoke is fitted.

Furthermore, a lens unit of the third aspect of the invention is provided with a taking lens, and a light quantity adjustment apparatus that adjusts a quantity of light passing through the taking lens, where the light quantity adjustment apparatus is provided with the light quantity adjustment apparatus as descried in the first or second aspect. Then, an optical apparatus of the fourth aspect of the is provided with a lens unit having a taking lens, and a light quantity adjustment apparatus that adjusts a quantity of light passing through the taking lens, and light receiving means for receiving light of the quantity of light that is adjusted by the light quantity adjustment apparatus and that passes through the taking lens, where the lens unit is the lens unit as described in the third aspect.

Advantageous Effect of the Invention

According to the above-mentioned light quantity adjustment apparatus as described in the first aspect of the invention, the board for supporting the driving member is provided with the support plane that supports the blade members to enable the members to travel, the concave portion in the support plane to store the driving member from the plane side for supporting the blade members, the support portion in the concave portion to support one end of the shield yoke, and holding means for storing and supporting the driving member in the concave portion so that one end of the shield yoke is supported in the support portion and that the other end of the shield yoke can be positioned in the reference surface of the coil frame, the reference surface for positioning the shield yoke is formed in the coil frame, the coil frame is fixed to the base board, and the shield yoke is thereby pressed in a sandwich state with one end against the support portion of the base board and the other end against the positioning reference surface of the coil frame, and is held without rattling. As a result, it is possible to reliably keep the installation position of the shield yoke relative to the magnet rotor in a beforehand set idle state, and the invention has the effect for enabling the light quantity adjustment apparatus to operate smoothly.

Further, in the light quantity adjustment apparatus of the invention as described in the second aspect, the above-mentioned coil frame in the first aspect is comprised of the first coil frame and the second coil frame, in the first coil frame are formed the reference surface for positioning the other end of the shield yoke and the support portion supported on the board by the holding means of the board, in the other second coil frame is formed the side surface into which the inner circumferential surface of the shield yoke is fitted, and even when the coil frame is comprised of two upper and lower frames, first coil frame and second coil frame, by winding the electromagnetic coil around the outer circumference of the integrated first and second coil frames, the second coil frame supporting the shield yoke is reliably supported on the base board via the first coil frame. As a result, it is possible to reliably keep the installation position of the shield yoke relative to the magnet rotor in a beforehand set idle state, and the invention has the effect for enabling the light quantity adjustment apparatus to operate smoothly.

Furthermore, the lens unit of the invention as described in the third aspect is provided with the above-mentioned light quantity adjustment apparatus as described in the first or second aspect, the light quantity adjustment apparatus operates smoothly corresponding to a change in the light quantity, and as a result, the invention has the effect that it is possible to provide the lens unit capable of performing correct exposure control. Moreover, the optical apparatus of the fourth aspect provided with the lens unit has the same effect.

BRIEF DESCRIPTION OF DRAWINGS

FIG. 14 contains explanatory views to explain a position relationship between the magnet rotor and the shield yoke, where

BEST MODE FOR CARRYING OUT THE INVENTION

The invention will be described below based on preferred Embodiments shown in drawings.

[Configuration of an Optical Apparatus]

Figure 1:
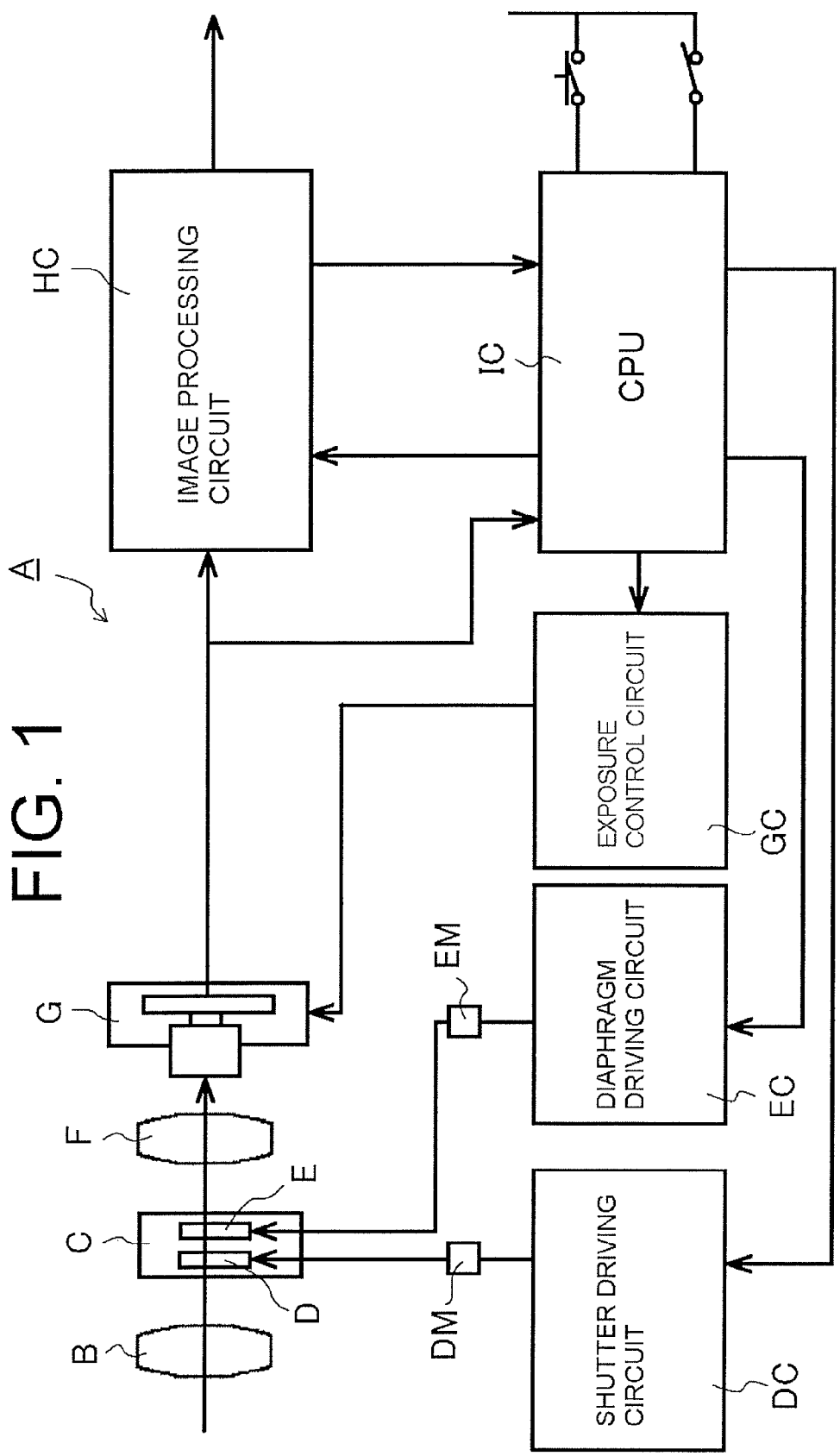
FIG. 1 is a configuration diagram of principal part of an optical apparatus equipped with a light quantity adjustment apparatus according to the invention.

First, an optical apparatus will be described based on FIG. 1. FIG. 1 is a configuration diagram of principal part of an optical apparatus such as a digital camera and a video camera equipped with a light quantity adjustment apparatus according to the invention. In the figure, A is the optical apparatus, B is a first lens group, C is the light quantity adjustment apparatus, D is a shutter apparatus, DC is a shutter driving circuit, DM is a shutter driving motor, E is a diaphragm apparatus, EC is a diaphragm driving circuit, EM is a diaphragm driving motor, F is a second lens group, G is an image pickup apparatus, GC is a exposure control circuit, HC is an image processing circuit, and IC is a central processing unit (CPU). Then, each component will first be descried briefly.

<Optical Apparatus>

As the optical apparatus A, in this Embodiment, a configuration diagram of principal part of a video camera is shown, and a series of operation of the apparatus will be described later.

<First Lens Group>

The first lens group B is a front group lens of zoom lenses constituting a "two-group zoom" frequently used in general.

<Light Quantity Adjustment Apparatus>

The light quantity adjustment apparatus C is provided in between the first lens group B and second lens group F constituting zoom lenses of "two-group zoom", controls a quantity of reflected light from a subject, not shown, incident through the first lens group B to a correct quantity of exposure light, and is comprised of the shutter apparatus D and the diaphragm apparatus E. In addition, a diaphragm/shutter multifunction apparatus is sometimes used in which the shutter apparatus D also serves as the function of the diaphragm apparatus E.

<Shutter Apparatus>

The shutter apparatus D is an apparatus which fast opens and closes an exposure aperture (with a diameter of the circle of 6 mm) from an open state to a closed state, for example, at a shutter speed of 0.001 second (1 msec).

<Shutter Driving Circuit>

The shutter driving circuit DC is a driving circuit for driving and controlling the shutter driving motor DM to open and close the shutter apparatus D at a high speed.

<Shutter Driving Motor>

The shutter driving motor DM is a driving motor to open and close the shutter apparatus D at a high speed by changing the rotation direction or rotation condition as appropriate by the direction of a current supplied from the shutter driving circuit DC or the passage state of the current.

<Diaphragm Apparatus>

The diaphragm apparatus E is an apparatus which reduces the exposure aperture (with a diameter of the circle of 6mm) into a correct aperture amount, for example, immediately before the image pickup apparatus G starts exposure, to determine the exposure time together with the shutter speed of the shutter apparatus D, and which is opened and closed at a low speed as compared with the shutter apparatus D.

<Diaphragm Driving Circuit>

The diaphragm driving circuit EC is a driving circuit that drives and controls the diaphragm driving motor EM to open and close the diaphragm apparatus E at a low speed.

<Diaphragm Driving Motor>

The diaphragm driving motor EM is a driving motor to open and close the diaphragm apparatus E at a low speed by changing the rotation direction or rotation condition as appropriate by the direction of a current supplied from the diaphragm driving circuit EC or the passage state of the current.

<Second Lens Group>

The second lens group F is a rear group lens of zoom lenses constituting the "two-group zoom" together with the first lens group B described previously, and in general, forms an optical system with a zoom scale of 12 times together with the first lens group B.

<Image Pickup Apparatus>

The image pickup apparatus G is a solid-state image pickup device using CMOS (Complementary Metal Oxide Semiconductor) comprised of CMOS image sensor (Complementary Metal Oxide Semiconductor Image Sensor), uses COMS ¼ type, for example, and supports high definition of total 4,200,000 pixels (2,650,000 effective pixels for moving image, 3,540,000 effective pixels for still image).

<Exposure Control Circuit>

The exposure control circuit GC controls image reading control of the image pickup apparatus G together with the shutter driving circuit DC and the diaphragm driving circuit EC, and transfers image data read by the image pickup apparatus G to the image processing circuit HC.

<Image Processing Circuit>

The image processing circuit HC processes the image data which is controlled by the exposure control circuit GC and transferred from the image pickup apparatus G to be reproducible, and transfers the image data that is processed to be reproducible to an image reproduction apparatus such as a printer, not shown.

<Central Processing Unit>

The central processing unit (CPU) IC collectively manages all of the circuits of the shutter driving circuit DC, diaphragm driving circuit EC, exposure control circuit GC, and image processing circuit HC to control each circuit as appropriate, and has storage means for storing the image data processed in the image processing circuit HC.

[Operation of the Optical Apparatus]

A series of operation of the optical apparatus will be described next briefly. First, by turning on the apparatus power supply, the light quantity adjustment apparatus C is placed in the initial state. By the light quantity adjustment apparatus C being placed in the initial state, the image pickup apparatus G captures light which is incident from the first lens group B and passes through the light quantity adjustment apparatus C. Then, the image processing circuit HC processes the image data from the image pickup apparatus G, detects the light quantity of the light captured in the image pickup apparatus G, and transfers the light quantity data to the central processing unit (CPU) IC. Concurrently, the central processing unit (CPU) IC processes the transferred data, performs an operation so that the light quantity of the light captured in the image pickup apparatus G is a correct light quantity, controls each of the exposure control circuit GC, the diaphragm driving circuit EC, and the shutter driving circuit DC according to correct exposure, drives the diaphragm driving motor EM and the shutter driving motor DM, and controls each of the diaphragm apparatus E and the shutter apparatus D to open and close as appropriate. Concurrently, the image pickup apparatus G, which starts capturing image signals by the exposure control circuit GC, transfers the image data to the image processing circuit HC after correct exposure. Then, the image processing circuit HC transfers the data to the image reproduction apparatus such as a printer and a monitor, not shown.

[Light Quantity Adjustment Apparatus]

Figure 2:
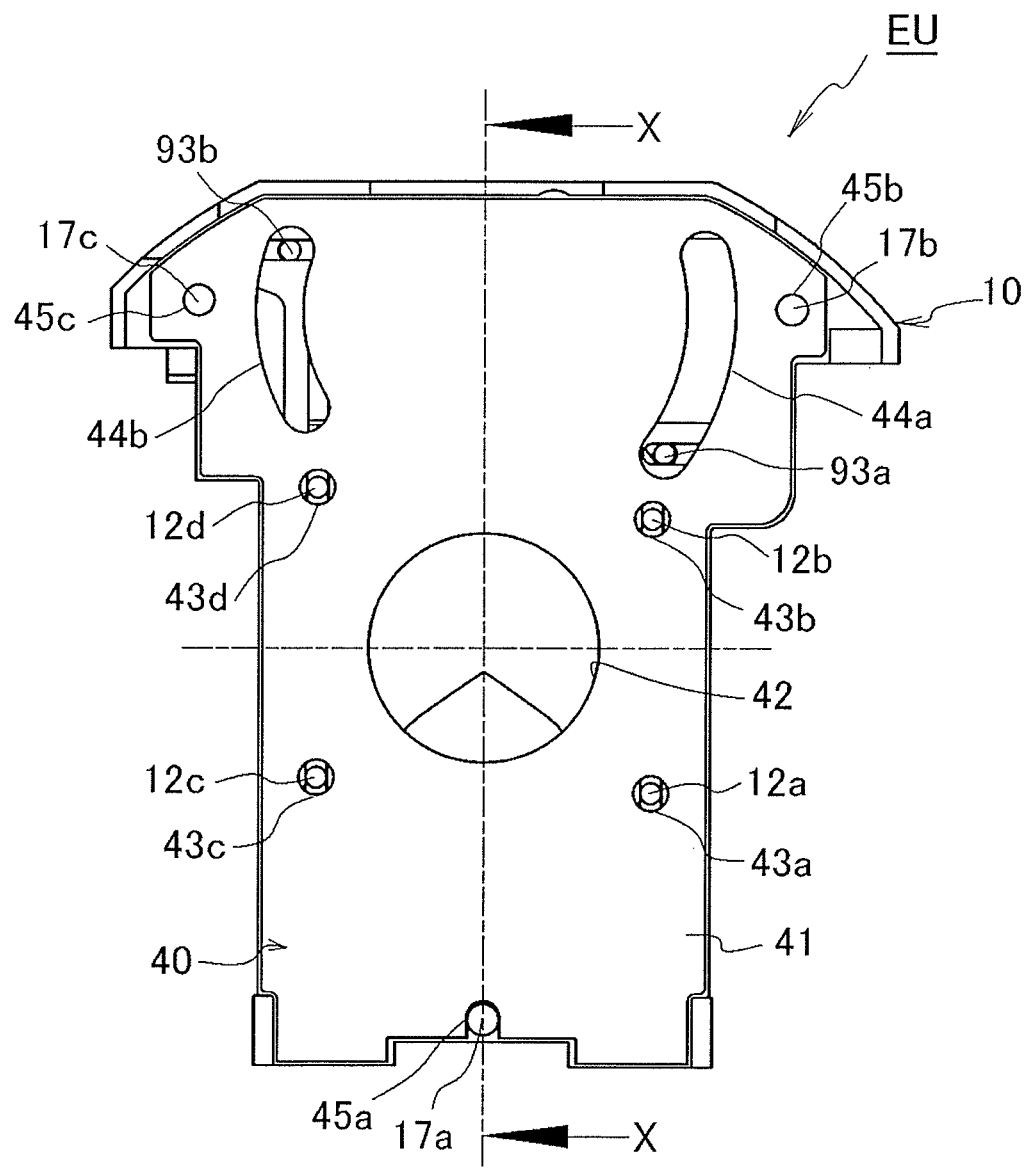
FIG. 2 is a front plan view of the light quantity adjustment apparatus (diaphragm apparatus) according to the invention.
Figure 3:
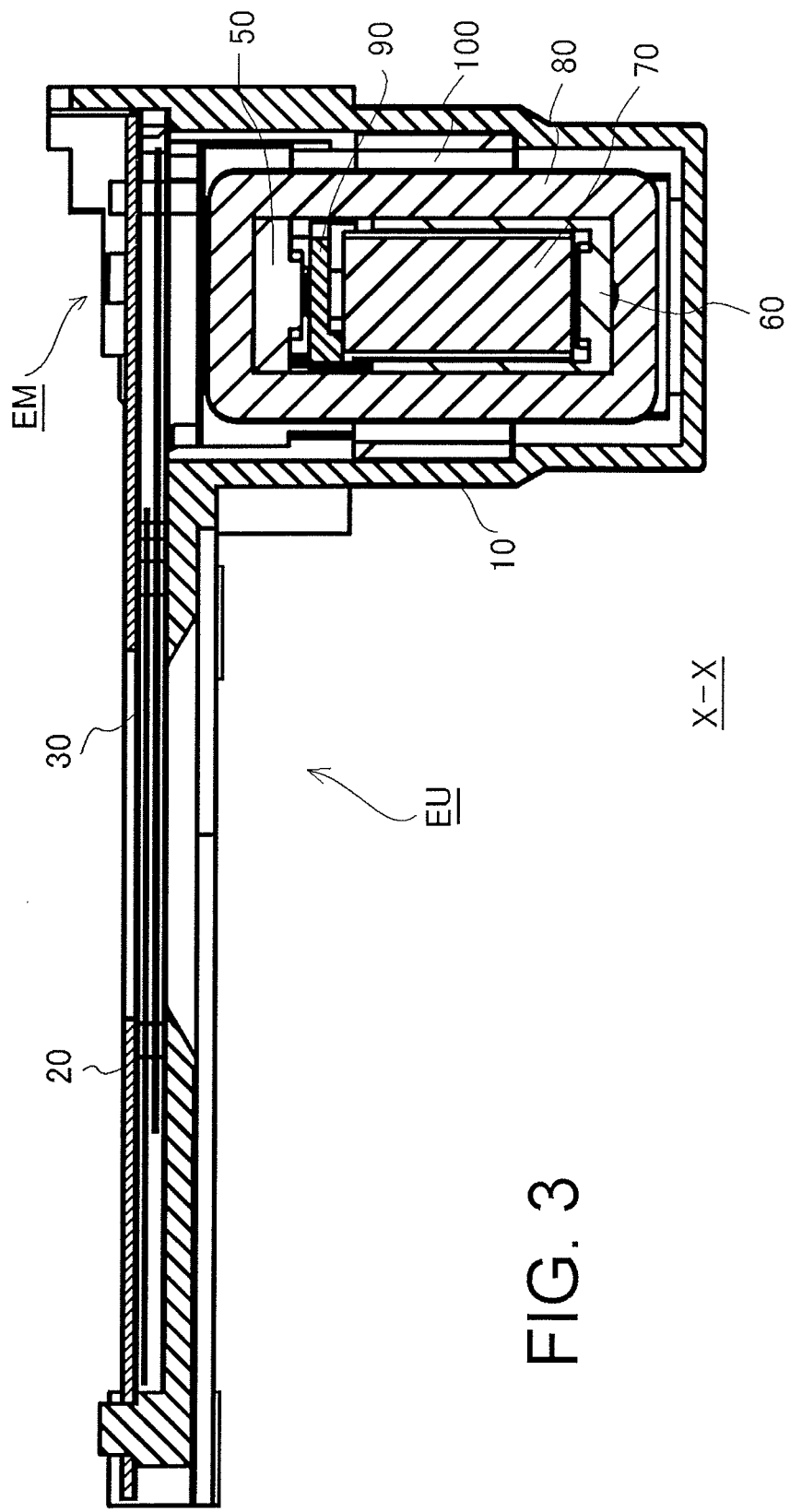
FIG. 3 is a transverse sectional view in the apparatus of FIG. 2.
Figure 4:
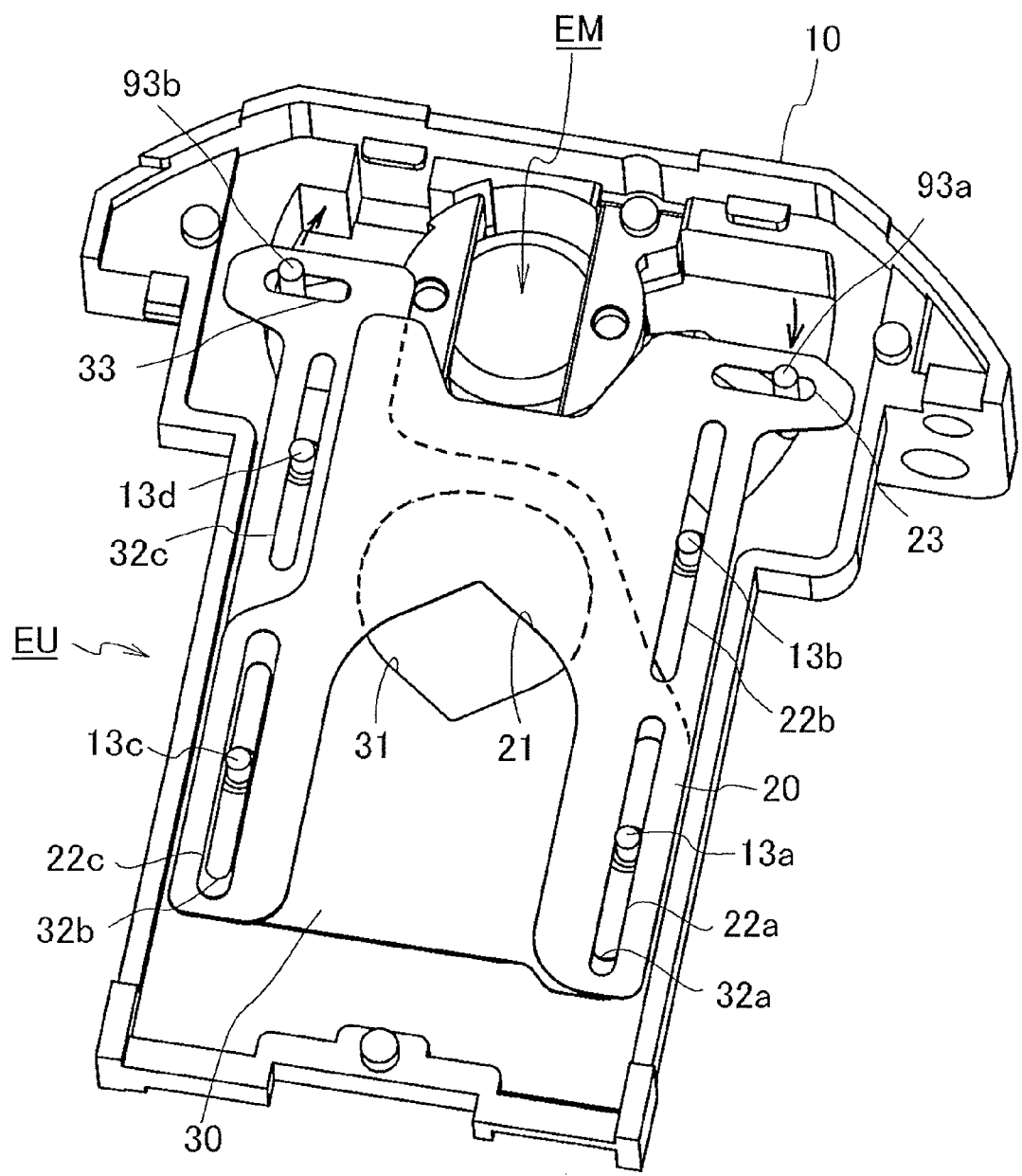
FIG. 4 is a perspective view of a state in which a second board (hold-down plate) in the apparatus of FIG. 2 is removed.
Figure 5:
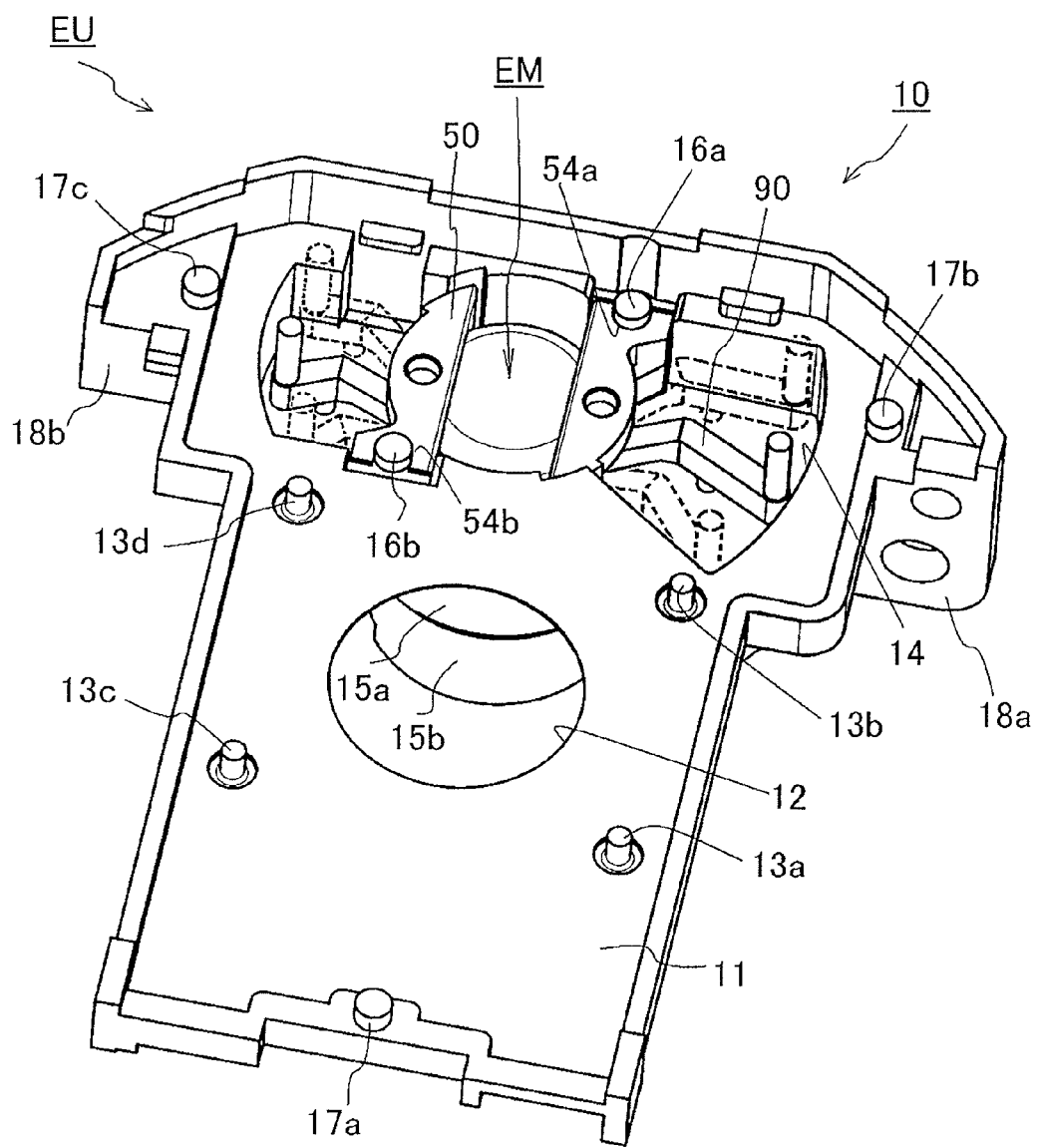
FIG. 5 is a perspective view of a state in which diaphragm blades are removed from the perspective view of FIG. 4.
Figure 6:
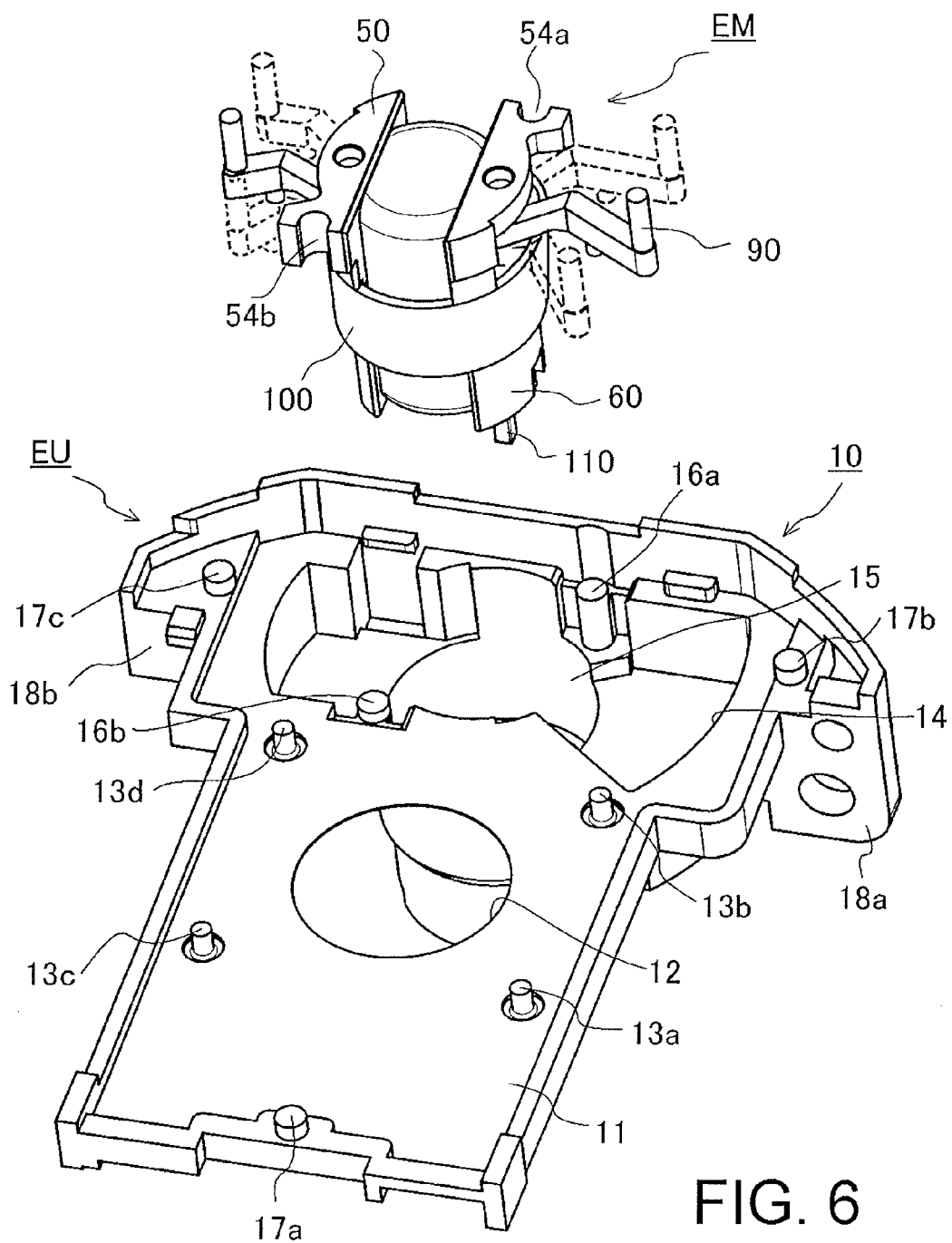
FIG. 6 is a fragmentary exploded perspective view of a state in which a diaphragm driving motor is removed upward from the perspective view of FIG. 5.
Figure 7:
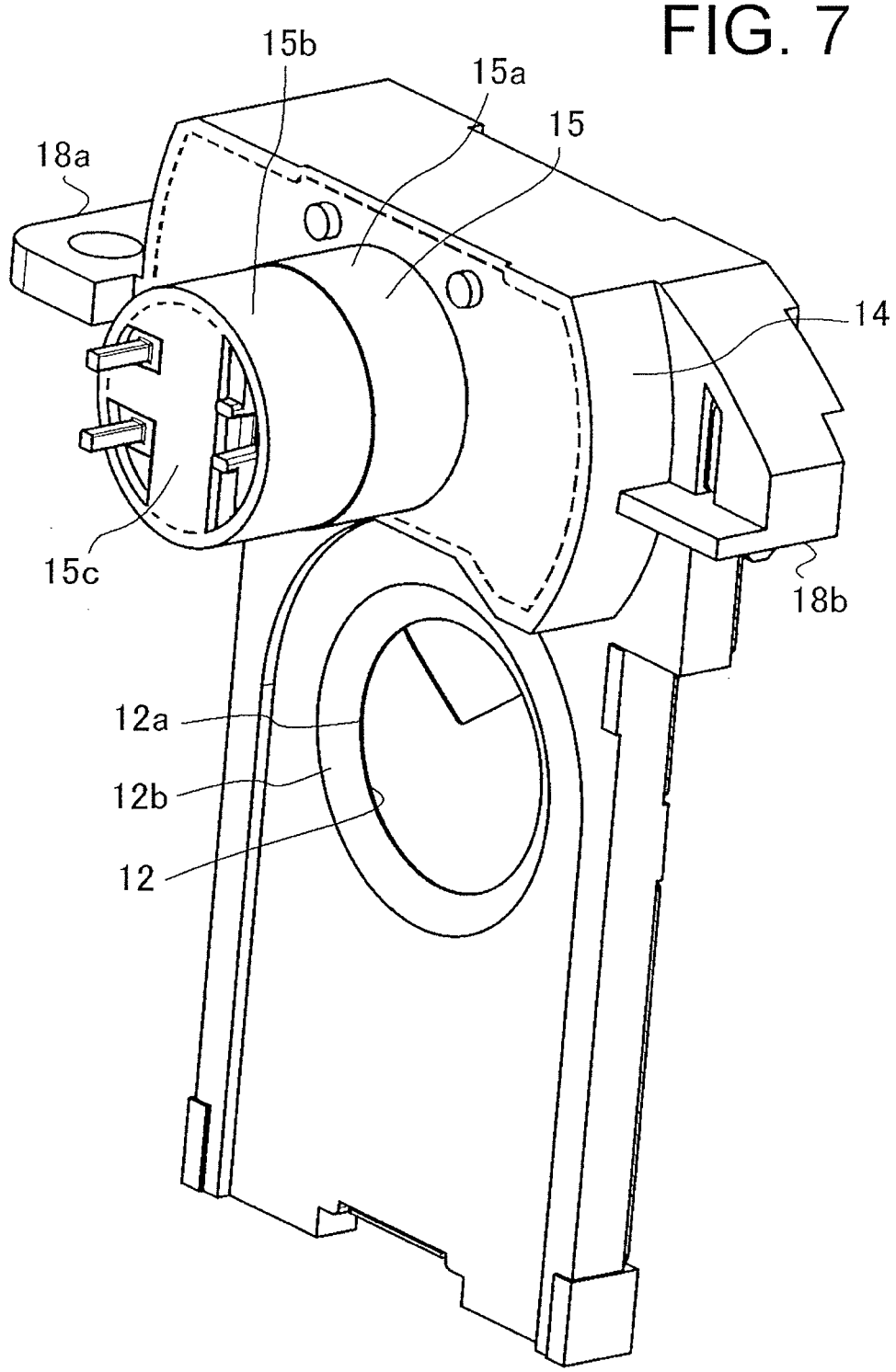
FIG. 7 is a perspective view of the apparatus of FIG. 2 viewed from the back side.
Figure 8:
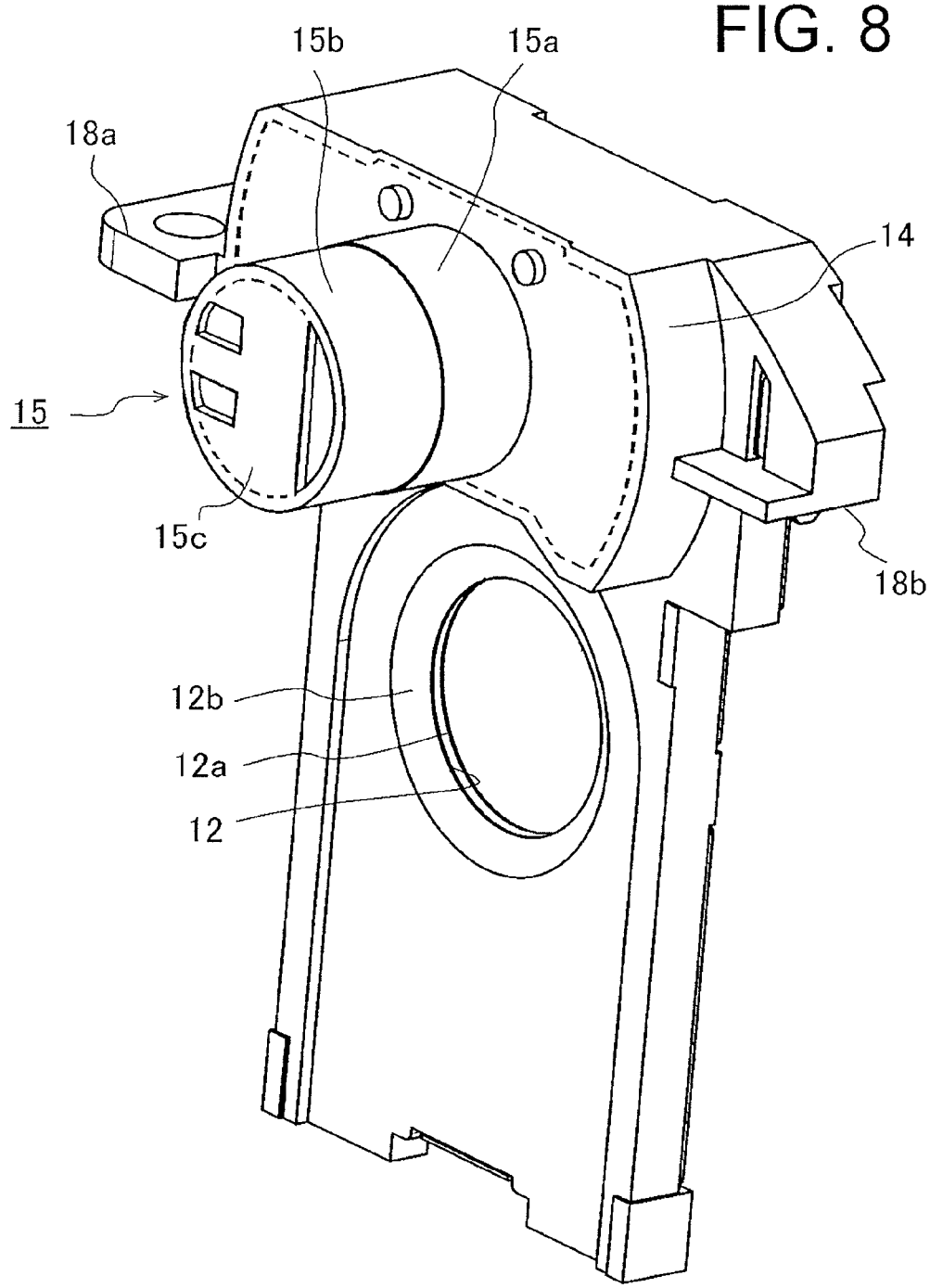
FIG. 8 is a perspective view to explain a shape of a base board with all members removed from the perspective view of FIG. 7.
Figure 9:
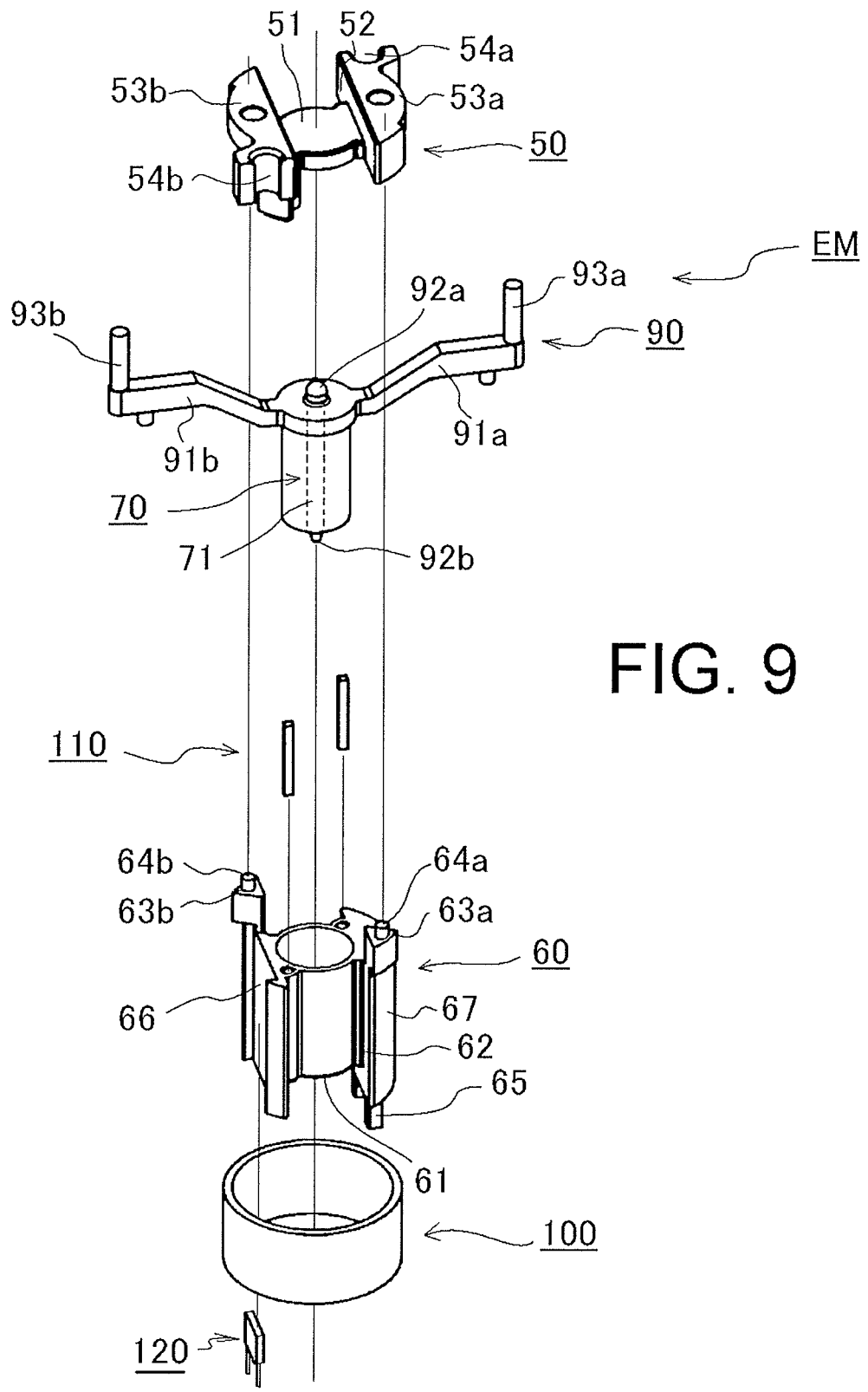
FIG. 9 is an exploded perspective view of principal part of the diaphragm driving motor as shown in FIG. 6.
Figure 10:
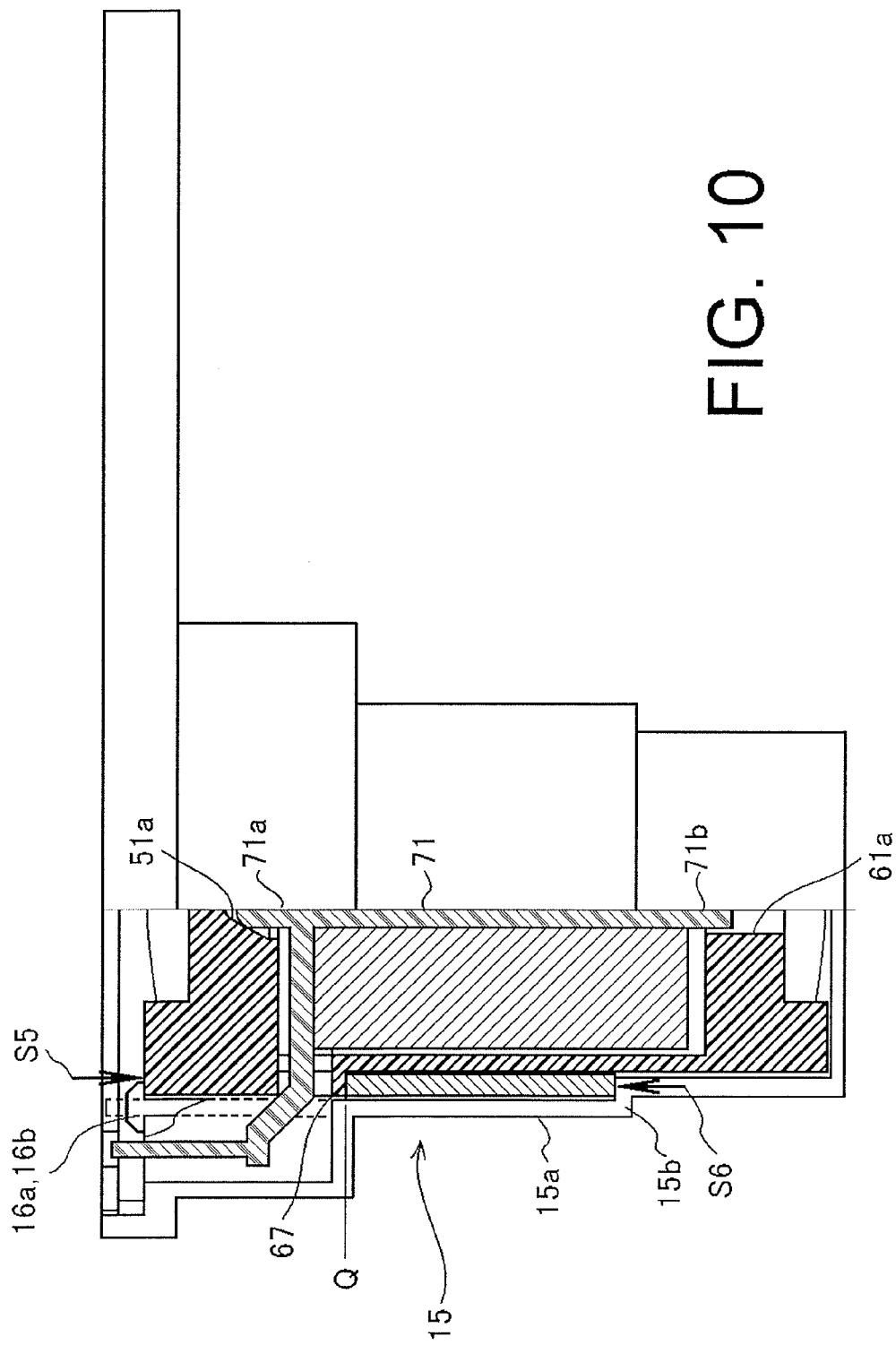
FIG. 10 is a fragmentary sectional view of a mechanism for setting positions of a magnet rotor and a shield yoke of the invention.
Figure 11:
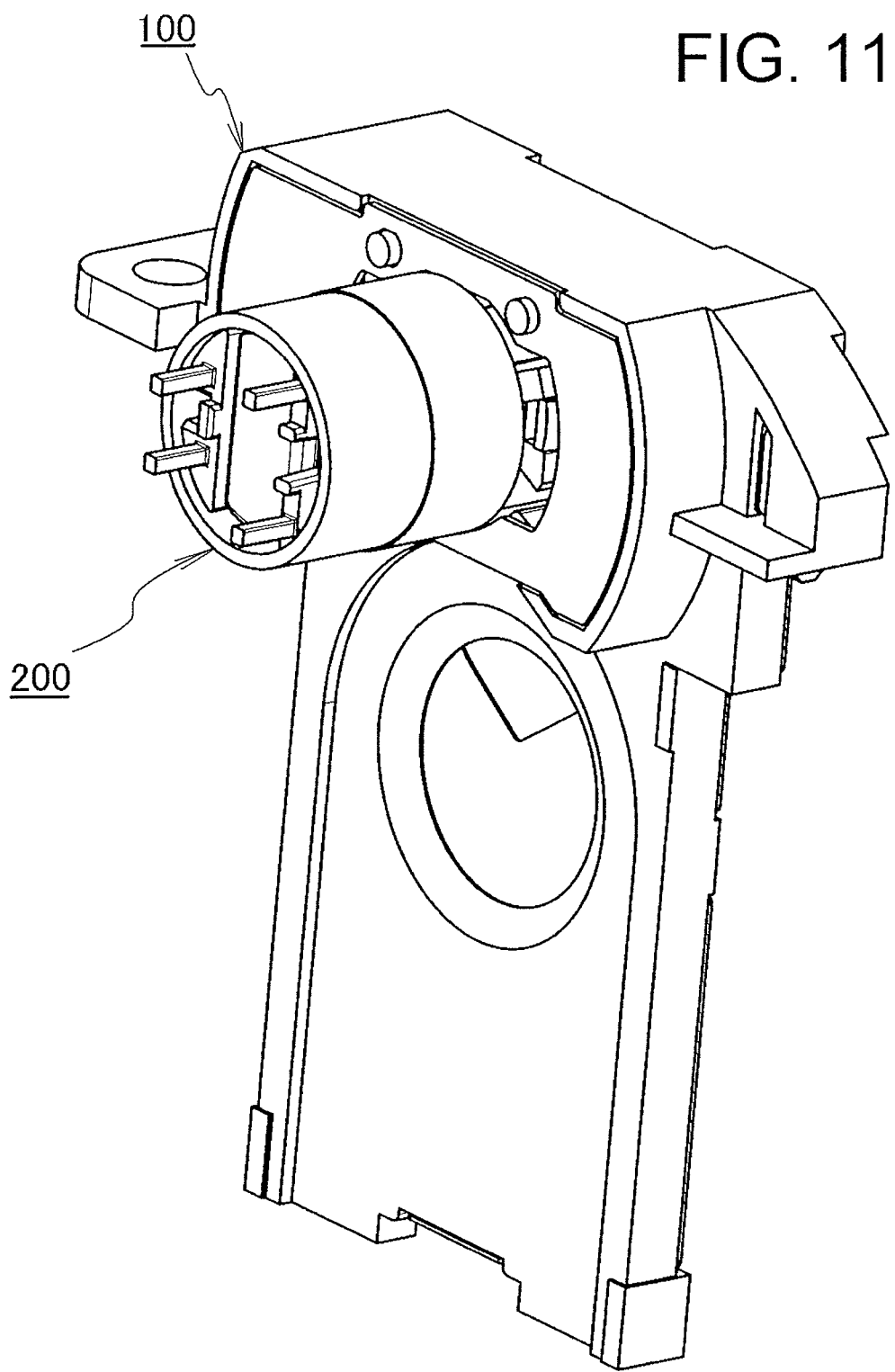
FIG. 11 is a perspective view to explain a conventional light quantity adjustment apparatus.
Figure 12:
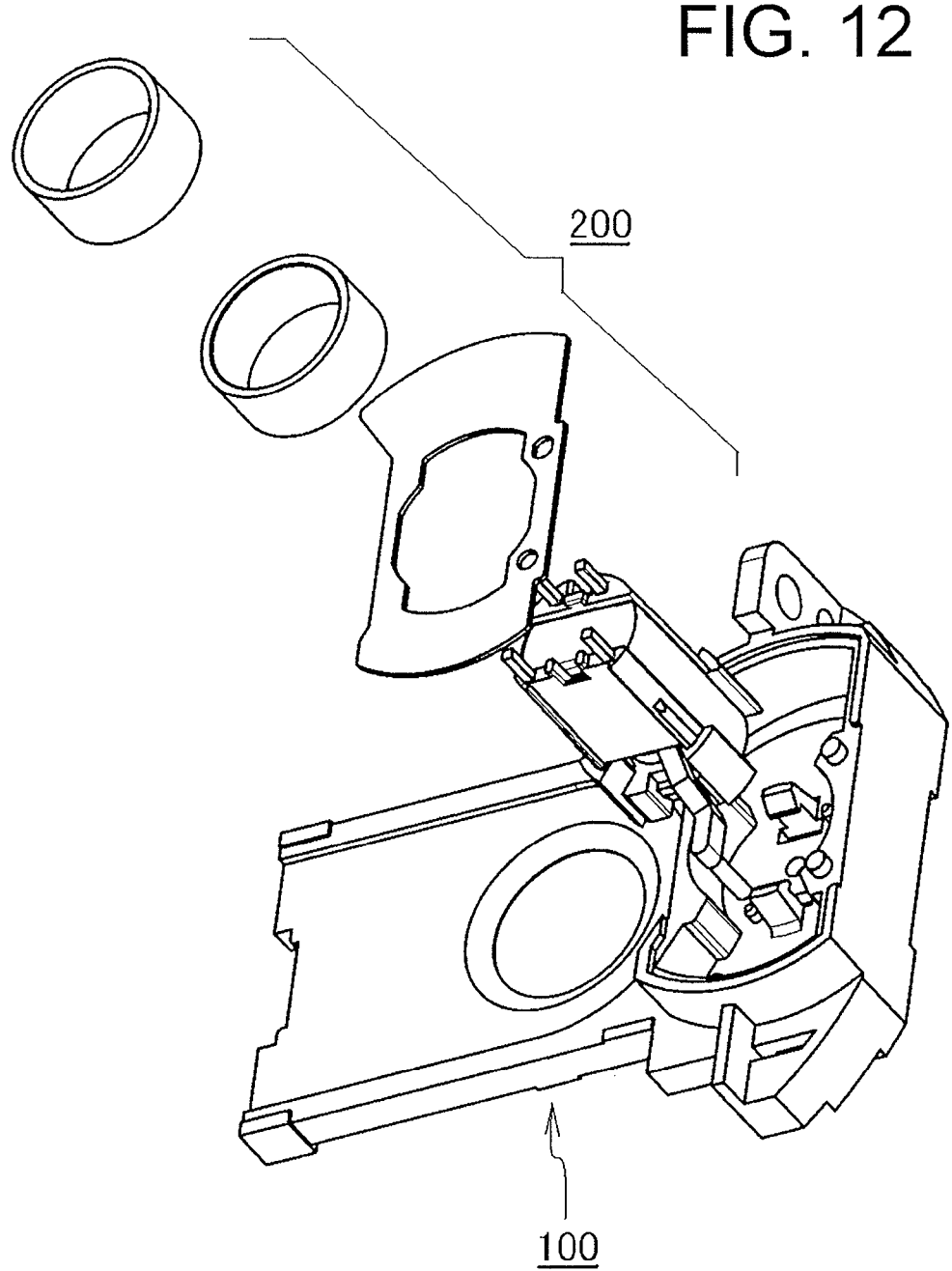
FIG. 12 is an exploded perspective view of disassembled principal part of the apparatus of FIG. 11.
Figure 13:
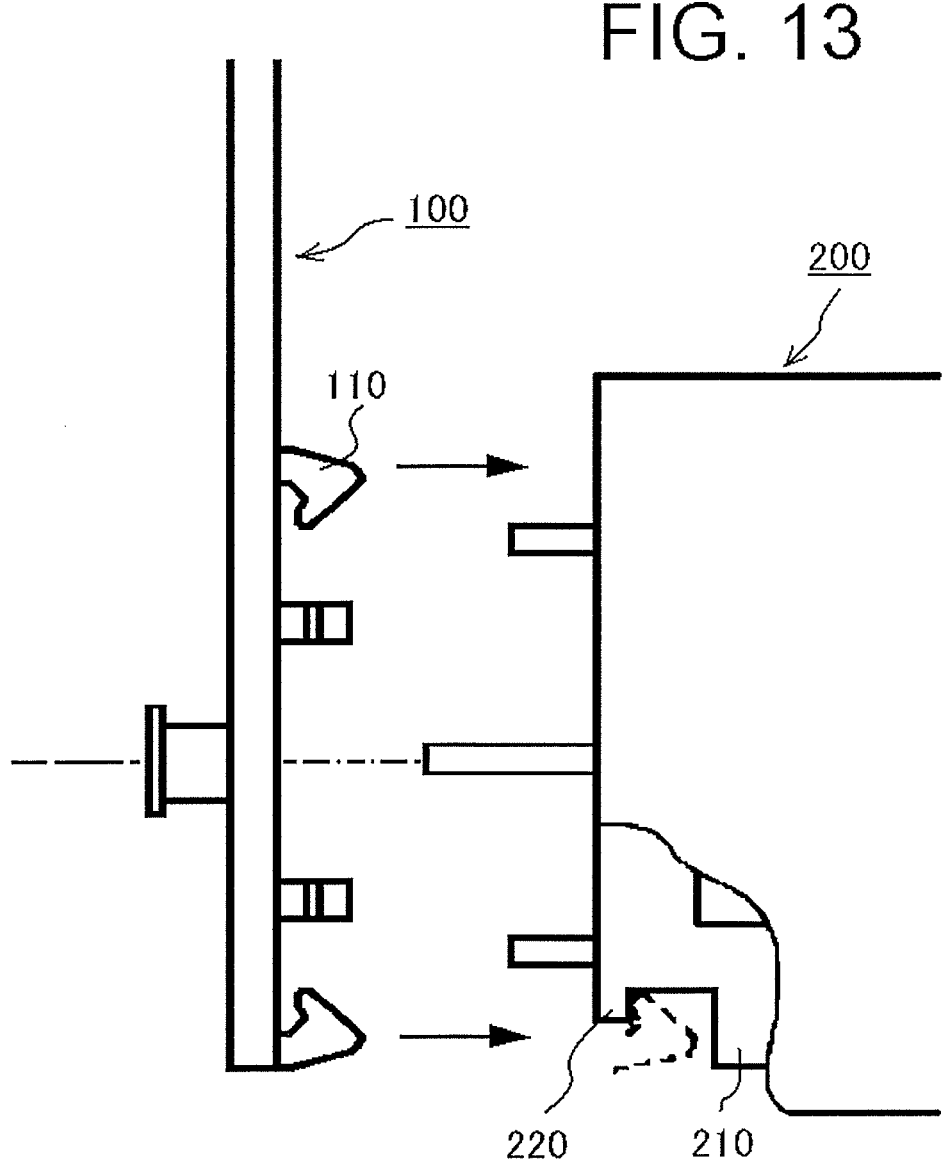
FIG. 13 is a support structure view to explain a support structure of the diaphragm driving motor in the conventional light quantity adjustment apparatus.

Described next is the diaphragm apparatus installed as the light quantity adjustment apparatus according to the invention, based on FIGS. 2 to 10. FIG. 2 is a front plan view of the diaphragm apparatus, FIG. 3 is a transverse sectional view of the apparatus, FIG. 4 is a perspective view of a state in which a hold-down plate that is a second board is removed, FIG. 5 is a perspective view of a state in which diaphragm blades are further removed from the perspective view, FIG. 6 is a fragmentary exploded perspective view of a state in which the diaphragm driving motor is removed upward from the perspective view of FIG. 5, FIG. 7 is a perspective view of the apparatus of FIG. 2 viewed from the back side, FIG. 8 is a perspective view to explain a shape of only the base board with all members removed from the perspective view, FIG. 9 is an exploded perspective view of principal part of the diaphragm driving motor as shown in FIG. 6, and FIG. 10 is a fragmentary sectional view of a mechanism for setting positions of a magnet rotor and a shield yoke of the invention. In addition, the diaphragm apparatus can be replaced and implemented as the shutter apparatus or diaphragm/shutter multifunction apparatus by changing driving control to high speed as described previously, and the description is omitted on the specific structure of the shutter apparatus. Further, in assignment of numerals in the figures, it is assumed that almost the same shape indicates the same member and has the same function.

[Configuration of the Diaphragm Apparatus]

The entire configuration of the diaphragm apparatus E will be descried first. In the figures, the diaphragm apparatus E is comprised of a diaphragm unit EU formed of a base board 10, a pair of diaphragm blades 20, 30 and a hold-down plate 40, and a driving motor EM formed of two, upper and lower, coil frames 50, 60, NS bipolar magnet rotor 70, electromagnetic coil 80, driving arm 90, shield yoke 100, magnetic pins 110 and hole element 120.

<Diaphragm Unit>

The diaphragm unit EU will be described first. As shown in FIGS. 2 to 8, the diaphragm unit EU is comprised of the base board 10, a pair of diaphragm blades 20, 30 and the hold-down plate 40, swings the pair of two diaphragm blades 20, 30 in mutually opposite directions by the diaphragm motor EM, forms a large or small diaphragm aperture as appropriate inside the exposure aperture of the base board 10 by the diaphragm blades 20, 30, and has the function of thereby adjusting the quantity of light passing through the exposure aperture. Each of the components constituting the diaphragm unit EU will be described below.

<Base Board>

As shown in FIG. 6, the base board 10 is formed by die-molding of polycarbonate resin (PC) with glasses, and in a plane 11 supporting the diaphragm blades 20, 30 swingably are formed an exposure aperture 12, spindles 13 (13a to 13d) that respectively support the diaphragm blades 20, 30 swingably, a concave groove 14 that stores swing arms 91 (91a, 91b) of a driving arm 90 to enable the diaphragm motor EM to be installed from the plane 11 side, a concave portion 15 formed on the bottom of the concave groove 14 to store the diaphragm driving motor EM, positioning protrusions 16 (16a, 16b) that determine an installation position of the diaphragm driving motor EM to be installed on the side face of the concave groove 14, positioning protrusions 17 (17a to 17c) to position and attach the hold-down plate 40 that supports the diaphragm blades 20, 30 from above so that the diaphragm blades 20, 30 are not removed from the spindles 13 (13a to 13d), and protrusions 18 (18a, 18b) protruding from the external form for apparatus installation. Further, as shown in FIGS. 7 and 8, when the base board 10 is viewed from the back side, the exposure aperture 12 is formed of an inclined plane 12b cut in trapezoidal cross section, and a thin-width side plane 12a shaved by the inclined plane 12b to prevent reflection. Furthermore, the concave portion 15 protruding from the bottom of the concave groove 14 to the back side forms a yoke storage portion 15a on the base end portion side that stores the shield yoke 100 inside, a support portion 15b that supports the stored shield yoke 100 from below, and a bottom 15c that supports the whole of the installed diaphragm driving motor EM. In addition, the external form of the base board 10 forms the shape of a T with the protrusion portions 18 (18a, 18b) protruding in the upper portion, the board is capable of being installed in between the first lens group B and the second lens group F forming a lens barrel from the outside of the lens barrel, and with the board installed, the protrusion portions 18 (18a, 18b) are fixed to the lens barrel.

<First Diaphragm Blade>

The first diaphragm blade 20 forms the shape as shown in FIG. 4, and is obtained by die-cutting, by pressing, a sheet material made of black polyethylene terephthalate (PET) with a sheet thickness of 50 to 70 μm with carbon fibers blended also for measures against static electricity, and in the blade 20 are formed a diaphragm portion 21 forming a diaphragm aperture to reduce the exposure aperture 12 of the base board 10 together with the second diaphragm blade 30, slit grooves 22 (22a to 22c) supported swingably on the plane 11 of the base board 10 by the spindles 13 (13a to 13c), and a slit groove 23 to which is driving-coupled a driving pin 93a formed in the swing arm 91a of the driving arm 90 of the diaphragm driving motor EM.

<Second Diaphragm Blade>

The second diaphragm blade 30 is provided between the base board 10 and the first diaphragm blade 20, forms the shape with part thereof shown by dotted lines in FIG. 4, and as in the first diaphragm blade 20, is obtained by die-cutting, by pressing, a sheet material made of black polyethylene terephthalate (PET) with a sheet thickness of 50 to 70 μm with carbon fibers blended also for measures against static electricity, and in the blade 30 are formed a diaphragm portion 31 forming the diaphragm aperture to reduce the exposure aperture 12 of the base board 10 together with the first diaphragm blade 20, slit grooves 32 (32a to 32c) supported swingably on the plane 11 of the base board 10 by the spindles 13 (13a, 13c, 13d), and a slit groove 33 to which is driving-coupled a driving pin 93b formed in the swing arm 91b of the driving arm 90 of the diaphragm driving motor EM. In addition, in this Embodiment, the full aperture diameter of the diaphragm aperture formed by the first diaphragm blade 20 and the second diaphragm blade 30 is set to be smaller than any diameter of the exposure aperture 12 of the baseboard 10 and the exposure aperture 42 formed in the hold-down plate 40, and determines a reference aperture diameter of the diaphragm apparatus.

<Hold-Down Plate>

As shown in FIG. 2, the hold-down plate 40 is manufactured by die-cutting and concurrently folding, by pressing, a metal sheet material made of stainless material (SUS) with a sheet thickness of 0.2 mm, and forms a plane 41 for supporting the diaphragm blades 20, 30, and in the plane 41 are formed the exposure aperture 42 opposed to the exposure aperture 12 of the base board 10, relief holes 43 (43a to 43d) through which frond end portions of the spindles 13 (13a to 13d) of the base board 10 are capable of protruding, respectively, slit holes 44 (44a, 44b) through which the driving pins 93 (93a, 93b) formed in the driving arm 90 of the diaphragm driving motor EM are capable of protruding, and positioning portions 45 (45a to 45c) that engage in the positioning protrusions 17 (17a to 17c) of the base board 10.

<Diaphragm Driving Motor>

The diaphragm driving motor EM will be described next. As shown in FIGS. 3, 6 and 9, the diaphragm driving motor EM is comprised of two, upper and lower, coil frames 50, 60, NS bipolar magnet rotor 70, electromagnetic coil 80, driving arm 90, shield yoke 100, magnetic pins 110 and hole element 120, enables the NS bipolar magnet rotor 70 supporting the driving arm 90 to reciprocate within the range of about 60 degrees by switching the passage direction of current to the electromagnetic coil 80, causes the diaphragm blades 20, 30 driving-coupled to the driving pins 93 (93a, 93b) of the driving arm 90 to swing in mutually opposite directions by this reciprocating motion, thereby reduces the exposure aperture with the diaphragm blades 20, 30, and thus has the function as a driving source to adjust the light quantity. Each of the components constituting the diaphragm driving motor EM will be described below.

<Upper Coil Frame>

The upper coil frame 50 is obtained by resin molding using a polyacetal resin (POM) formed of polymers with an oxymethylene structure as a unit structure, and in the frame 50 are formed a bearing portion 51 forming a bearing that axially supports rotatably one end 92a of a rotating shaft 92 of the driving arm 90, a winding groove 52 to wind the electromagnetic coil 80 around the outer circumference of the bearing portion 51, flange portions 53 (53a, 53b) forming the side faces of the winding groove 52, while forming positioning holes, not shown, into which protrusions 64 (64a, 64b) for fit formed in the lower coil frame 60 are fitted and positioned, and concave circular fit grooves 54 (54a, 54b) which are formed in the flange portions 53 (53a, 53b), fitted into the positioning protrusions 16 (16a, 16b) of the base board 10 and positioned. In addition, with the fit grooves 54 (54a, 54b) fitted into the positioning protrusions (16a, 16b) of the base board 10, each of the positioning protrusions 16 (16a, 16b) is thermally crimped, and the diaphragm driving motor EM is thereby secured to the base board 10.

<Lower Coil Frame>

The lower coil frame 60 is obtained by resin molding using a liquid crystal polymer resin (LCP), and in the frame 60 are formed a hollow circular bearing storage portion 61 that forms a bearing for axially supporting rotatably the other end 92b of the rotating shaft 92 of the driving arm 90 and that stores the magnet rotor 70, a winding groove 62 to wind the electromagnetic coil 80 around the outer circumference of the bearing storage portion 61, and flange portions 63 (63a, 63b) forming the side faces of the winding groove 62, while forming protrusions 64 (64a, 64b) for fit which are fitted into positioning holes, not shown, of the upper coil frame 50. Further, two terminals 65 (65a, 65b) embedded at a distance are formed on the bottom of one of the flange portions 63a, and a plane 66 to arrange the hole element 120 is formed on the wall of the other flange portion 63b. In addition, with the flange portions 63 (63a, 63b) and the flange portions 53 (53a, 53b) of the upper coil frame 50 overlapped, the arms of the driving arm 90 protrude to form a shakable aperture.

<Magnet Rotor>

The NS bipolar magnet rotor 70 is an anisotropic magnet obtained by casting of a neodymium magnet, forms a cylindrical shape with a diameter of 5 mm with a hollow hole 71 formed, which the rotating shaft 92 of the driving arm 90 penetrates, and is polarized in two, NS, poles in the diameter direction about the center axis of the hollow hole 71 as the center, and with the easy axis of the anisotropic magnet and the driving pins 93 (93a, 93b) of the driving arm 90 positioned in a predetermined position relationship, the driving arm 90 is integrated to the magnet rotor 70 by insert forming.

<Electromagnetic Coil>

As the electromagnetic coil 80, an enamel wire with a wire diameter of about 0.05 mm to 0.06 mm is used. With the upper coil frame 50 and lower coil frame 60 mutually overlapped, the enamel wire is wound about 600 times in the winding grooves 52 and 62 formed outside the coil frames 50, 60, respectively.

<Driving Arm>

The driving arm 90 is obtained by resin molding using a polycarbonate resin (PC), and has the rotating shaft 92 in the rotation center, and swing arms 91 (91a, 91b) extending horizontally from the proximity of the shaft end portion 92a on one end side of the rotating shaft 92, and the driving pin 93a is integrally formed in the arm 91a of the swing arm 91, while the driving pin 93b is integrally formed in the arm 91b. Further, the shaft end portion 92b on the other end side of the rotating shaft 92 extends to a length for penetrating the magnet rotor 70 and protruding from the other surface, and is supported rotatably by the bearing of the lower coil frame 60. Meanwhile, the shaft end portion 92a on one end side of the rotating shaft 92 is supported rotatably by the bearing of the upper coil frame 50.

<Shield Yoke>

The shield yoke 100 is obtained by cutting a hollow ring, which is molded by injection of ferrite (SUY) in the shape of a pipe, into 2.5 mm width, and the inside diameter is formed in dimensions capable of being fitted into the outside circumference for yoke fit formed in the flange portions 63 (63a, 63b) of the lower coil frame 60. In addition, it is beforehand designed that the center of the shield yoke 100 is coincident with the center of NS two-pole of the magnet rotor 70 stored rotatably in the coil frames 50, 60.

<Magnetic Pin>

The magnetic pins 110 are obtained by cutting an iron wire of about 0.2 mm into about 3 mm, are driven into positions shown in the figure in the flange portions 63 (63a, 63b) of the lower coil frame 60 before overlapping the upper coil frame 50, and are arranged to obtain the so-called cocking torque for magnetically keeping the magnet rotor 70 in a predetermined position without current being fed to the magnetic coil 80.

<Hole Element>

The hole element 120 is a position detecting sensor provided to detect a rotation position of the magnet rotor 70. This output data is fed back to the diaphragm driving circuit, the driving arm 90 is thereby maintained in a predetermined swing position, and the diaphragm aperture formed by the first diaphragm blade 20 and the second diaphragm blade 30 is reduced to a predetermined diaphragm aperture.

[Assembly Process of the Diaphragm Apparatus]

The assembly process of the diaphragm apparatus will be described next.

<Assembly Process of the Diagram Driving Motor>

The assembly process [first step to fifth step] of the diaphragm driving motor EM will be described first based on FIG. 9.

1st step: The magnetic pins 110 and terminals 65 (65a, 65b) are driven into two respective portions as shown in the figure in the lower coil frame 60.

2nd step: The integrally-formed magnet rotor 70 with the driving arm 90 is inserted in the bearing storage portion 61 of the lower coil frame 60, and the shaft end portion 92b of the driving arm 90 is axially supported by the bearing, not shown, of the bearing storage portion 61 of the lower coil frame 60.

3rd step: In this state, positioning holes, not shown, provided in the flange portions 53 (53a, 53b) of the upper coil frame 50 are fitted into the positioning protrusions 64 (64a, 64b) of the flange portions 63 (63a, 63b) of the lower coil frame 60, respectively, and the upper coil frame 50 is overlapped with the lower coil frame 60, with the swing arms 91 (91a, 91b) of the driving arm 90 protruding outward from an opening open between the flange portions 53 (53a, 53b) of the lower coil frame 50 and the flange portions 63 (63a, 63b) of the lower coil frame 60.

4th step: The coil frame set with the upper coil frame 50 overlapped with the lower coil frame 60 is set in a winding position of a coil winding machine.

5th step: One end of the electromagnetic coil 80 is led to one of the terminals 65 (65a, 65b) of the lower coil frame 60, then the coil frame set is rotated, and the electromagnetic coil 80 is wound in the winding grooves 52, 62 of the coil frame set. After winding, the other end of the electromagnetic coil 80 is led to the other one of the terminals 65 (65a, 65b) of the lower coil frame 60.

<Assembly Process of the Diaphragm Driving Motor>

The assembly process [sixth step to eighth step] of the diaphragm driving motor will be described next based on FIGS. 5 and 6.

6th step: As shown in FIG. 6, the coil frame set around which the electromagnetic coil 80 is wound is removed from the coil winding machine, and as shown in FIG. 6, the shield yoke 100 is fitted into the lower coil frame 60. In addition, in the state as shown in the figure, the wound electromagnetic coil 80 is omitted.

7th step: The coil frame set into which the shield yoke 100 is fitted is inserted in the concave portion 15 of the base board 10 to be the state as shown in FIG. 5, so that the fit grooves (54a, 54b) of the upper coil frame 50 are fitted into the positioning protrusions 16 (16a, 16b) of the base board 10. At this point, as shown in FIG. 7, the coil frame set is set with the terminals 65 (65a, 65b) of the lower coil frame 60 protruding from the bottom 15c of the concave portion 15 protruding to the back side of the base board 10.

8th step: In the state of FIG. 5, with the coil frame set inserted in the concave portion 15 of the base board 10 kept not to float, the positioning protrusions 16 (16a, 16b) of the base board 10 are thermally crimped, and the diaphragm driving motor EM is thereby attached to the base board 10.

<Assembly Process of the Diaphragm Unit>

The assembly process [ninth step to twelfth step] of the diaphragm unit will be described next based on FIGS. 2 to 4 and 7.

9th step: As shown in FIG. 4, with the driving motor EM attached to the base board 10 in the last step as shown in FIG. 5, first, the slit groove 33 of the second diaphragm blade 30 is fitted into the driving pin 93b of the driving arm 90, the slit grooves (32a to 32c) are respectively fitted into the spindles 13 (13a, 13c, 13d) of the base board 10, and the second diaphragm blade 30 is attached swingably to the spindles 13 (13a, 13c, 13d).

10th step: On the second diaphragm blade 30, the slit groove 23 of the first diaphragm blade 20 is fitted into the driving pin 93a of the driving arm 90, the slit grooves 22 (22a to 22c) are respectively fitted into the spindles 13 (13a to 13c), and the first diaphragm blade 20 is swingably attached to the spindles 13 (13a to 13c).

11th step: While keeping the state in which the first diaphragm blade 20 and the second diaphragm blade 30 are attached to the base board 10, as shown in FIG. 2, the hold-down plate 40 is covered from above so that the positioning portions 45 (45a to 45c) respectively engage in the positioning protrusions 17 (17a to 17c) of the base board 10 in positions in which the front end portions of the spindles 13 (13a to 13d) of the base board 10 protrude respectively through the relief holes 43 (43a to 43d) of the hold-down plate 40, and the hold-down plate 40 is attached to the base board 10.

12th step: Subsequently, in the state as shown in FIG. 7, a power supply circuit board, not shown, to supply power to the electromagnetic coil 80 is attached to the bottom 15c of the concave portion 15 protruding to the backside of the base board 10, and power supply terminals of the power supply circuit board are electrically connected to respective terminals 65 (65a, 65b) led to the electromagnetic coil 80. Further, the hole element 120 which is electrically connected and attached to the power supply circuit board is arranged in the position opposed to NS two poles of the magnet rotor 70 in between the shield yoke 100 and the plane 66 formed in the flange portion 63b of the lower coil frame 60, and assembly of the diaphragm apparatus E is completed.

[Explanation of Operation of the Diaphragm Apparatus]

The operation of the diaphragm apparatus will be described next with reference to FIG. 4. In FIG. 4, when the swing arms 91 (91a, 91b) of the driving arm 90 of the diaphragm driving motor EM swing in a clockwise direction, the driving pin 93a formed in the front end portion of the swing arm 91a moves the slit groove 23 of the first diaphragm blade 20 downward on the sheet, and the first diaphragm blade 20 thereby travels along the spindles 13 (13a to 13c) of the baseboard 10 corresponding to a swing amount of the driving arm 90. Meanwhile, the driving pin 93b formed in the front end portion of the swing arm 91b moves the slit groove 33 of the second diaphragm blade 30 upward on the sheet, and the second diaphragm blade 30 thereby travels along the spindles 13 (13a, 13c, 13d) of the base board 10 in the direction opposite to the travel direction of the first diaphragm blade 20 corresponding to the swing amount of the driving arm 90. Accordingly, corresponding to a correct exposure amount set by the central processing unit (CPU) IC, the central processing unit (CPU) IC controls power supply to the electromagnetic coil 80 of the diaphragm driving motor EM so that the exposure control circuit GC is of a correct diaphragm value, the driving arm 90 of the diaphragm driving motor EM thereby reciprocates as appropriate, and the apparatus thus operates to vary the diagram aperture formed by the first diaphragm blade 20 and the second diaphragm blade 30.

[Supplementary Explanation of the Embodiment]
<Mechanism for Setting Positions of the Magnet Rotor and the Shield Yoke>

Figure 14A:
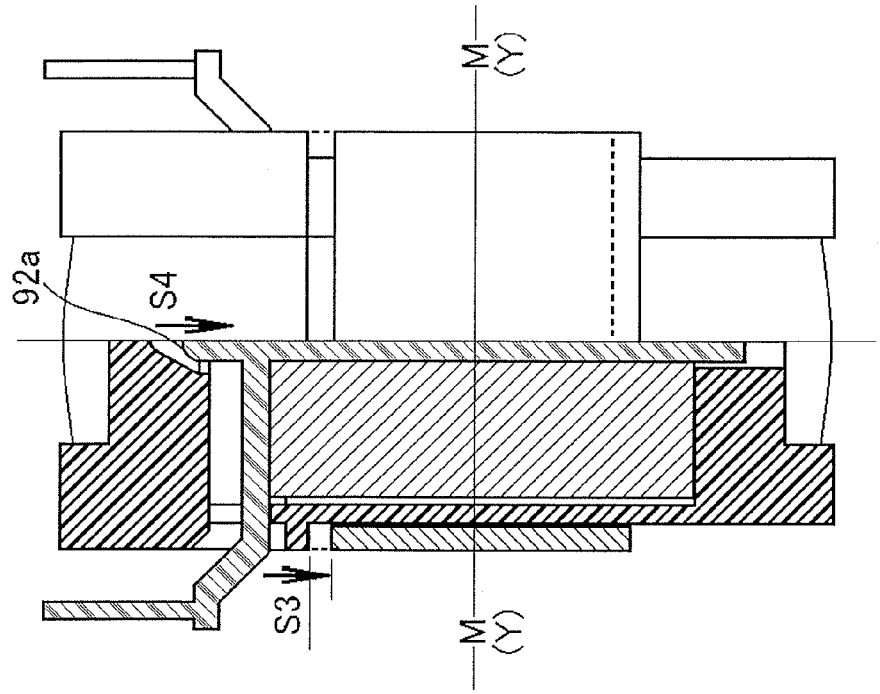
FIG. 14A is a fragmentary sectional view showing the position relationship between the magnet rotor and the shield yoke according to a design value.
Figure 14B:
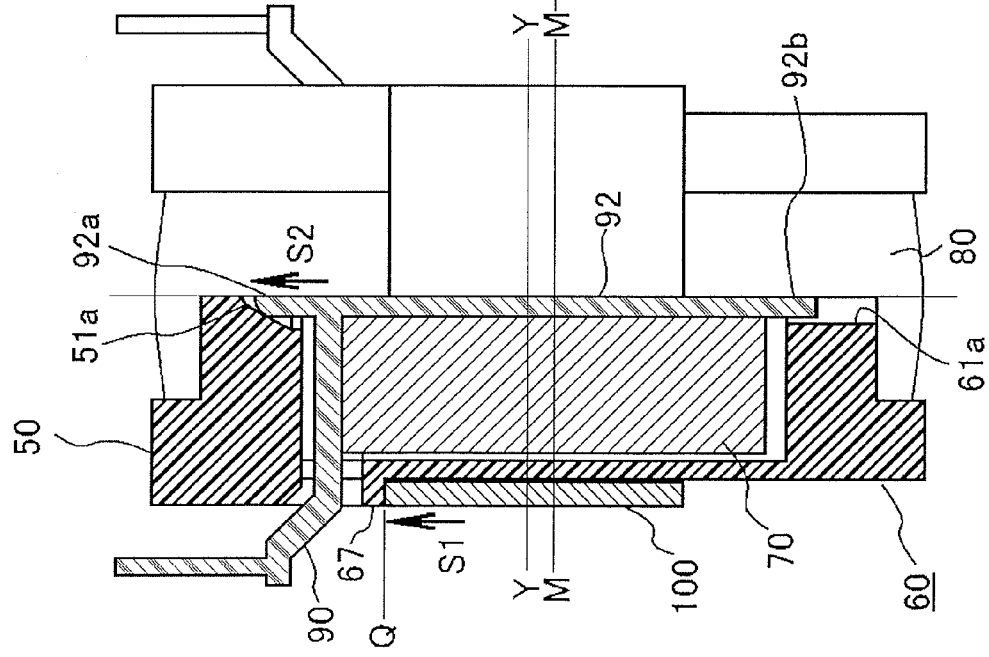
FIG. 14B is a fragmentary sectional view showing the position relationship between the magnet rotor and the shield yoke to raise the issue.

The mechanism for setting positions of the magnet rotor and the shield yoke will be described first. As shown in FIG. 10, the upper coil frame 50 is biased in the S5 direction shown in the figure, the positioning protrusions 16 (16a, 16b) formed in the base board 10 are thermally crimped with the shield yoke 100, stored in the yoke storage portion 15a of the concave portion 15 formed in the base board 10, pressed against the support portion 15b of the concave portion 15, the upper coil frame 50 is secured to the base board 10, and the shield yoke 100 is thus held in a sandwich state between the positioning reference surface Q of the lower coil frame 60 and the yoke storage portion 15a of the concave portion 15 formed in the base board 10 without rattling. As a result, it is possible to reliably keep the installation position of the shield yoke relative to the magnet rotor in the state as shown in FIG. 14A, and it is possible to operate the diaphragm apparatus smoothly.

In addition, in the case as described above, for positioning and securing of the upper coil frame 50, the positioning protrusions 16 (16a, 16b) formed in the base board 10 are thermally crimped, and when a space is reserved, screwing and biasing means such as spring biasing may be used.

Further, the aforementioned Embodiment discloses the two-blade configuration of the first diaphragm blade 20 and the second diaphragm blade 30 as a pair of diaphragm blades, and as the pair of diaphragm blades, a four-blade configuration of the first to fourth diaphragm blades maybe used. For example, using the above-mentioned diaphragm driving motor EM, it may be configured that the first and second diaphragm blades are driving-coupled to one of the driving pins, 93a, of the driving arm 90, the third and fourth diaphragm blades are driving-coupled to the other one of the driving pins, 93b, of the driving arm 90, and that the first to fourth diaphragm blades are concurrently operated by the driving arm 90. At this point, one of the driving pins, 93a, of the driving arm 90 is driving-coupled to each of driving pin 93a-1 and driving pin 93a-2 arranged in positions with different arm lengths so that the first and second diaphragm blades travel together in the same direction with a difference in the travel velocity. Similarly, the other one of the driving pins, 93b, of the driving arm 90 is driving-coupled to each of driving pin 93b-1 and driving pin 93b-2 arranged in positions with different arm lengths so that the third and fourth diaphragm blades travel together in the direction opposite to the travel direction of the first and second diaphragm blades with a difference in the travel velocity. In this case, in contrast to the above-mentioned Embodiment in which the aperture shape formed by a pair of diaphragm blades is a rectangle, it is possible to form an aperture shape of a polygon more than a rectangle using a set of four diaphragm blades.

[Other Embodiments]

In the above-mentioned description, the diaphragm apparatus is described as the Embodiment of the invention, and as a matter of course, the invention is capable of being carried into practice by replacing the diaphragm blades with shutter blades or other blade members to substitute a shutter apparatus or other light quantity adjustment apparatuses, concurrently replacing the diaphragm driving motor with a shutter driving motor, or other driving means such as a rotation driving motor including a pulse motor and a reciprocating driving actuator including an electromagnetic solenoid, and determining installation structures on the board, and driving coupling structure to the blade members corresponding to each shape of the driving means.

Further, as the number of blade members as described above, the Embodiment of a pair of two blades, or a set of four blades is described, but simply a single diagram aperture or the high number of blades such as six blades and nine blades may be used.

Furthermore, as the above-mentioned blade member, the structure for varying the aperture amount of the exposure aperture and thereby adjusting the light quantity is disclosed as one Embodiment, and for example, it is also possible to use members obtained by die-cutting a multi-stage ND filter or gradation ND filter in the shape of a blade as the blade member to adjust the light quantity of the exposure aperture.

Supplementary Explanation

First, a light quantity adjustment apparatus as described in the first aspect is provided with aboard 10 having an exposure aperture 12, blade members (first diaphragm blade 20, second diaphragm blade 30) that adjust a quantity of light passing through the exposure aperture, and driving means (diaphragm driving motor EM) for driving the blade members, the driving means is provided with an electromagnetic coil 80, a magnet rotor 70 that rotates by applying a current to the electromagnetic coil, a rotating shaft 92 that is the center of rotation of the magnet rotor, coil frame (upper coil frame 50, lower coil frame 60) which has bearings 51a, 51b for supporting opposite ends of the rotating shaft rotatably and around which the electromagnetic coil is wound, a reference surface Q for positioning formed in the coil frame, and a shield yoke 100 that is supported with respect to the reference surface and that magnetically shields the magnet rotor, and the board 10 is comprised of a support plane (plane 11) that supports the blade members to enable the members to travel, a concave portion 15 in the support plane to store the driving member from the plane side for supporting the blade members, a support portion 15b in the concave portion to support one end of the shield yoke, and holding means (positioning protrusions 16a, 16b) for storing and supporting the driving member in the concave portion so that one end of the shield yoke is supported in the support portion and that the other end of the shield yoke can be positioned in the reference surface of the coil frame.

Further, in a light quantity adjustment apparatus as described in the second aspect, the above-mentioned driving means as described in the first aspect is provided with an electromagnetic coil 80, a cylindrical magnet rotor 70 that rotates by applying a current to the electromagnetic coil, a rotating shaft 92 that is the center of rotation of the magnet rotor, a first coil frame 50 forming a bearing portion 51a that supports one shaft end portion 92a of the rotating shaft and a winding groove 52 in which the electromagnetic coil is wound around an outer circumference of the bearing portion, a second coil frame 60 forming a bearing portion 61a that supports the other shaft end portion of the rotating shaft and a winding groove 62 in which the electromagnetic coil is wound around an outer circumference of the bearing portion, a driving arm 90 (driving pines 93a, 93b) that rotates together with the rotating shaft and that drives the blade members, and an annular shield yoke 100 forming an inner circumferential surface opposed to an outer circumferential surface of the magnet rotor, in the first coil frame 50 are formed the reference surface Q to position the other end of the shield yoke 100 and a support portion 54 (fit grooves 54a, 54b) supported on the board 10 by the holding means (positioning protrusions 16a, 16b) of the board 10, and in the second coil frame 60 is formed a side surface 67 into which the inner circumferential surface of the shield yoke 100 is fitted.

Furthermore, an optical apparatus as described in the third aspect is provided with a taking lens (first lens group B, second lens group F), a light quantity adjustment apparatus C that adjusts a quantity of light passing through the taking lens, and image processing means (image processing circuit HC) for receiving light of the quantity of light that is adjusted by the light quantity adjustment apparatus and that passes through the taking lens, where the light quantity adjustment apparatus is provided with the light quantity adjustment apparatus as descried in the first or second aspect.

This application claims priority from Japanese Patent Application No. 2011-041830 filed on Feb. 28, 2011.

The invention claimed is:

1. A light quantity adjustment apparatus comprising:
a board having an exposure aperture;
blade members that adjust a quantity of light passing through the exposure aperture; and
a driving device for driving the blade members,
wherein the driving device is provided with an electromagnetic coil,
a magnet rotor that rotates by applying a current to the electromagnetic coil,
a rotating shaft that is the center of rotation of the magnet rotor,
a coil frame which has bearings for supporting opposite ends of the rotating shaft rotatably and around which the electromagnetic coil is wound,
a reference surface for positioning formed in the coil frame, and
a shield yoke that is supported with respect to the reference surface and that magnetically shields the magnet rotor, and
the board is comprised of a support plane that supports the blade members to enable the members to travel,
a concave portion in the support plane to store the driving device from the plane side for supporting the blade members,
a support portion in the concave portion to support one end of the shield yoke, and
holding means for storing and supporting the driving device in the concave portion so that one end of the shield yoke is supported in the support portion and that the other end of the shield yoke can be positioned in the reference surface of the coil frame.

2. The light quantity adjustment apparatus according to claim 1, wherein the driving device is provided with an electromagnetic coil,
a cylindrical magnet rotor that rotates by applying a current to the electromagnetic coil,
a rotating shaft that is a center of rotation of the magnet rotor,
a first coil frame forming a bearing portion that supports one shaft end portion of the rotating shaft and a winding groove in which the electromagnetic coil is wound around an outer circumference of the bearing portion,
a second coil frame forming a bearing portion that supports the other shaft end portion of the rotating shaft and a winding groove in which the electromagnetic coil is wound around an outer circumference of the bearing portion,
a driving arm that rotates together with the rotating shaft and that drives the blade members, and
an annular shield yoke forming an inner circumferential surface opposed to an outer circumferential surface of the magnet rotor,
wherein in the first coil frame are formed the reference surface to position the other end of the shield yoke and a support portion supported on the board by the holding means of the board, and in the second coil frame is formed a side surface into which the inner circumferential surface of the shield yoke is fitted.

3. A lens unit comprising:
a taking lens; and
a light quantity adjustment apparatus that adjusts a quantity of light passing through the taking lens,
wherein the light quantity adjustment apparatus is provided with the light quantity adjustment apparatus according to claim 1.

4. An optical apparatus comprising:
a lens unit having a taking lens, and
a light quantity adjustment apparatus that adjusts a quantity of light passing through the taking lens; and light receiving means for receiving light of the quantity of light that is adjusted by the light quantity adjustment apparatus and that passes through the taking lens,
wherein the lens unit is the lens unit according to claim 3.

* * * * *